March 18, 1924.
H. CHIREIX
1,487,012
CALLING ARRANGEMENT FOR SIGNALING
Filed Aug. 29, 1921
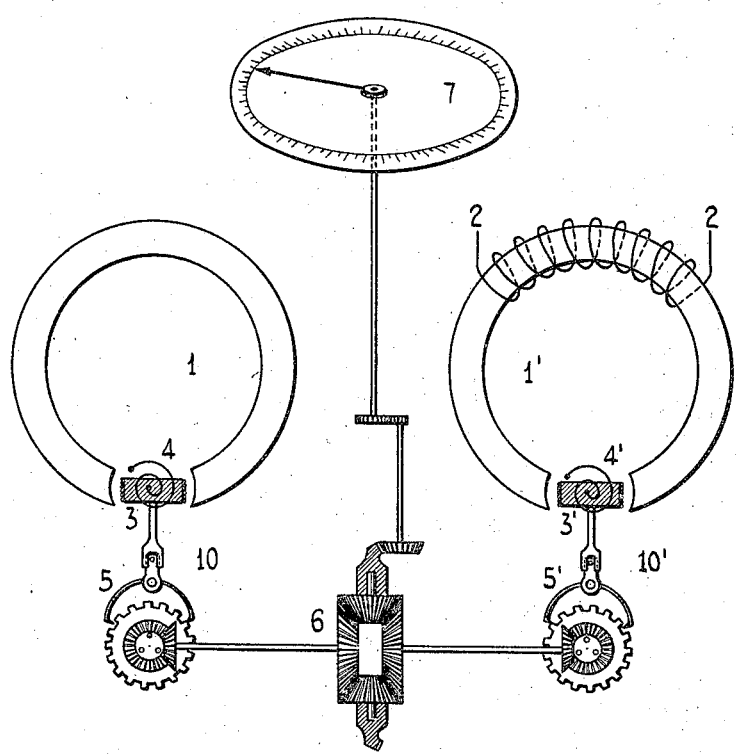
Inventor
HENRI CHIREIX
By his Attorney Ira J Adams Patented Mar. 18, 1924.

1,487,012

UNITED STATES PATENT OFFICE.

HENRI CHIREIX, OF PARIS, FRANCE.

CALLING ARRANGEMENT FOR SIGNALING.

Application filed August 29, 1921. Serial No. 496,669.

*To all whom it may concern:*

Be it known that I, HENRI CHIREIX, a citizen of the Republic of France, and a resident of Paris, France, have invented certain new and useful Improvements in Calling Arrangements for Signaling, of which the following is a specification, accompanied by drawings.

The present invention relates to an automatic calling arrangement particularly adaptable to wireless telephony and telegraphy, and is illustrated in the single figure of the accompanying drawing.

The strength of the signals received by a called station that correspond to the calling signals, is extremely low. A calling arrangement must be arranged in a manner to be irresponsive to atmospherics of even the greatest intensity. For these reasons, the calling device must be of the character of an energy integrating apparatus which actuates the call indicator only in case the total energy received attains a certain suitable value.

The arrangement forming the object of the present invention, is provided in accordance with the principle outlined by Ayrton and Perry which has already been made use of for quantity meters in the Aron system. As is well known, if a magnetic field generated by the current to be measured, actuates a magnetic pendulum, the oscillatory movement will be accelerated in such a manner that, at the end of a certain period of time, the difference between the movement of the magnetic pendulum and an ordinary pendulum having the same normal period, measures the quantity of the electricity issued during the same time.

In accordance with the present invention, a system comprising two isochronous pendulums 10 and 10' is provided. The pendulum itself may be of any type (straight pendulum, or circular pendulum controlled by gravity or a retractile spring). Any suitable motor mechanism, and regulating arrangement for equalizing the periods of the two pendulums may be provided. These two pendulums operate through the differential means 6 for causing the movement of a member 7 which, in response to a certain displacement, actuates the indicating apparatus (bell, visual signal, etc.).

One of the pendulums comprises an accelerating device arranged in the following manner: A stationary induction coil is traversed by the alternating current, before or after detection, generated by the receiving station, and an inductive winding short circuited around itself, is attached to the pendulum. The position of stable equilibrium of the pendulum should coincide with that position in which the inductive winding is not traversed by any flux. When the pendulum oscillates, it moves also the inductive winding, whereupon, if the inductor is energized by a current received, a current will be produced in the inductive winding. As a result of this, an antagonistic element is added to the mechanical element of the pendulum, whereby the movement or rate of oscillation of the latter is accelerated. As above stated, when the difference in the movement of the two pendulums attains a certain value, the calling device will be actuated.

A particularly advantageous arrangement for the accelerating device consists in its arrangement after the manner of the parts of a direct current ammeter having a movable frame, the magnetic circuits 1 and 1' of which are of laminated iron, one of which is provided with an inductive winding 2, and the frames 3 and 3' of which are short-circuited. The mechanical oscillations of the movable equipments 5 and 5' and spiral springs 4 and 4' are maintained by means of an anchor escapement.

These oscillations may also be maintained by means of a winding provided in the magnetic circuit and traversed by a current of any suitable frequency. It should be noted that a single winding may be used affording passage to both the maintaining and the calling current, means being provided for the usual protection of the exterior circuits of the coil (self induction and condensers).

As above stated, such an accelerating system may be associated with one of the two isochronous pendulums. In order, however, to increase the sensitiveness of the arrangement, it is advisable to subject the said pendulum to the oscillating frame of the accelerator. The relative increase in the speed of the pendulum system may be expressed as follows:

$$\frac{\Delta W}{W} = \frac{1}{2}\frac{Ce}{Cm}$$

In this expression, Ce designates the electromagnetic element and Cm the mechanical element. It is advisable, therefore, to reduce C as much as possible, i. e. to use a pendulum of the greatest possible speed and the smallest possible mass.

If such apparatus is used concurrently with a receiving station comprising a three-electrode tube detector, the inductive winding may be connected with the secondary of the transformer, the primary winding of which is provided in the plate circuit of the tube. In this case, the inductive current is an alternating current having a musical frequency. Furthermore, the high frequency current, before detection, may actuate the device, and preferably, no iron core should be used in the apparatus in this case.

Various modifications may be made in the apparatus without departing from the spirit of the invention. For example, the inductive winding may be in circuit with a very large capacity (from a mechanical standpoint, the position of stable equilibrium of the oscillating system should in this case coincide with the position in which the induced winding is traversed by the greatest flux). Preferably, the differential arrangement should be provided with a device, adapted periodically to return the call indicator actuating means to its initial position. In this manner, the effect of the totalization of the atmospherics will be eliminated, and systematic errors in the operation that cannot otherwise be regulated, will be corrected. If the oscillations are maintained by mechanical means, the motor spring may be automatically rewound under the control of local electric sources. The calling device may be completed to advantage by the addition of a selecting mechanism to the members already described. The purpose of this mechanism is, to actuate the call indicator only in response to a plurality of operations that follow each other in a predetermined cycle (or at predetermined intervals of time, etc.), and that are performed by the member responsive to the differential action of the two pendulums.

Having described my invention what I claim is:

1. A calling arrangement for signaling comprising two normally isochronous pendulums, means actuated by said calling signals for accelerating one of said pendulums and an indicating device actuated by differential movement of said pendulums.

2. A call indicator comprising a signal receiver, a pair of translating devices adapted to operate normally at the same rate of speed and means controlled by said receiver for varying the rate of speed of one of said translating devices and means responsive to the difference in movement of said devices.

3. A call indicator comprising a signal receiver, a pair of translating devices adapted to operate normally in a predetermined relation with each other, means controlled by said receiver for varying said relation and indicating means responsive to a predetermined amount of such variation.

4. A call indicator comprising a signal receiver, a pair of translating devices adapted to operate normally at the same rate of speed, a winding associated with said receiver and with one of said translating devices for varying the rate of speed of said translating device under the control of signals received and indicating means responsive to the difference in movement of said devices.

5. A call indicator comprising a signal receiver, a pair of translating devices constructed and arranged to operate normally at the same rate of speed, means controlled by said receiver for varying the rate of speed of one of said translating devices and differential indicating means associated with both said translating devices for indicating the difference in movement of said devices.

6. A call indicator comprising a signal receiver, a pair of translating devices adapted to operate normally at the same rate of speed, a winding controlled by said receiver and constructed and arranged to produce a flux to be cut by one of said translating devices whereby the rate of speed of said translating device is varied and differential means associated with said translating device for causing the indication of predetermined difference of movement of said device.

7. A calling arrangement for radio receiving stations comprising receiving circuits, a magnetic circuit associated with the receiving circuits, two normally isochronous pendulums, an inductive path associated with one of said pendulums and with the magnetic circuit adapted to accelerate one of said pendulums and means actuated by differential movement of said pendulums.

8. A calling arrangement for radio receiving stations, comprising receiving circuits, a magnetic circuit associated with the receiving circuit, two normally isochronous pendulums, means for synchronously oscillating said pendulums, an inductive path associated with one of said pendulums and with the magnetic circuit adapted to accelerate one of said pendulums, and means actuated by differential movement of said pendulums.

9. A calling arrangement for radio receiving stations, comprising receiving circuits, a pair of mechanical oscillators each comprising a rotatable coil and a magnetic path passing partly through said coils, a winding associated with said magnetic path, a source of current variable at a certain frequency for maintaining said oscillators in isochronous movement, means for short circuiting the magnetic path through one of said coils to provide an inductive path associated with the magnetic path, a winding associated with the receiving circuits and with the magnetic path of said last-mentioned oscillator and means adapted to be actuated by differential movement of said mechanical oscillators.

HENRI CHIREIX.